United States Patent

Boyer

[15] 3,693,861

[45] Sept. 26, 1972

[54] VIBRATION DAMPING SYSTEM FOR PINCH ROLLER

[72] Inventor: Marcel-Louis Boyer, 23 rue Leonard Mafrand, 92-Chatillon, France

[22] Filed: June 1, 1971

[21] Appl. No.: 148,549

[52] U.S. Cl.....................................226/177, 226/187

[51] Int. Cl. ..............................................B65h 17/22

[58] Field of Search.......226/176, 177, 181, 186, 187

[56] References Cited

UNITED STATES PATENTS 3,257,056 6/1966 Cederberg.................226/176

3,471,072 10/1969 Bolick .......................226/187

*Primary Examiner*—Richard A. Schacher
*Attorney*—Craig, Antonelli & Hill

[57] ABSTRACT

Drum for a tape reader where the tape speed reaches several hundreds of characters per second concerning more particularly the mounting of a roller which, pressing the tape on the sprocket of the drum which is in continual motion, gives the tape a jerky motion, driving it at the required rate. High-speed operation is improved by a double vibration damping system.

8 Claims, 3 Drawing Figures

INVENTOR
MARCEL-LOUIS BOYER
BY Craig, Antonelli & Hill
ATTORNEYS

VIBRATION DAMPING SYSTEM FOR PINCH ROLLER

The present invention concerns a capstan drive arrangement suitable for a high-speed intermittent tape drive, such as those required for tape readers in which the reading speed can be as high as several hundred characters per second. Such high speed tape readers find application in high speed telegraphic communications and in data transmission.

Tape drive systems for readers in which the reading speed may be as high as 1,000 characters per second require special design considerations. Generally such systems comprise a continuously motor-driven capstan over which the tape passes, the drive being only effective when the tape is pressed against the capstan by an idler roller on the opposite side of the tape arranged to be urgeable towards the capstan. The idler roller is often carried on a lever arm pivotable about a fixed axis by an electromagnet to urge the idler roller towards the capstan to produce a tape-driving pinch spot. The electromagnet receives a pulsed control voltage, to bring about the required step-bystep advance of the tape.

For increased operational speeds, the mechanical forces bringing about tape advance must be rapidly generated, whether drive or braking forces.

Furthermore, the distances which the moving parts of the drive mechanism must travel should be reduced to a minimum. Also, it is important to damp as much as possible the operation of setting the tape in movement, so as to ensure regular operation over a wide range of operating speeds.

To satisfy the second of these conditions, minimal travel of the moving parts, it has been proposed to maintain in the electromagnet a continuous current intended to bring the idler roller to a so-called "wiping" position. In this position the idler roller contacts the tape with substantially negligible pressure. The distance the idler roller must move to produce the tape-driving nip is thus reduced to some few tenths of a millimeter.

The system is difficult to adjust, however, and is not adaptable to different tape thicknesses.

For example, if a tape whose thickness is 0.08 millimeters is replaced by a thinner tape, with a thickness of, for example, 0.065 millimeters, with the idler roller in its wiping position, the air gap between the lever arm and the electromagnet is varied, decreased, for example. As the force of magnetic attraction varies inversely with the air gap concerned, the thinner band receives an increased pressure with the idler roller in its wiping position.

In accordance with the present invention, a capstan drive arrangement suitable for a high speed intermittent tape drive includes a motor-driven capstan, an idler roller carried on a lever arm, an electromagnet selectively operable to pivot the lever arm about its axis to urge the idler roller towards the capstan to produce a tape-driving pinch spot, the lever arm being so arranged that when the electromagnet is not operated the idler roller contacts the tape with substantially negligible pressure, the drive arrangement also including a damping system comprising an elastically deformable connection between the lever arm and a tube slidable on a rod, the tube and rod being coupled together by a spring.

The invention will now be described in more detail, by way of example only, with reference to the accompanying diagrammatic drawing, in which.

Figure 1:
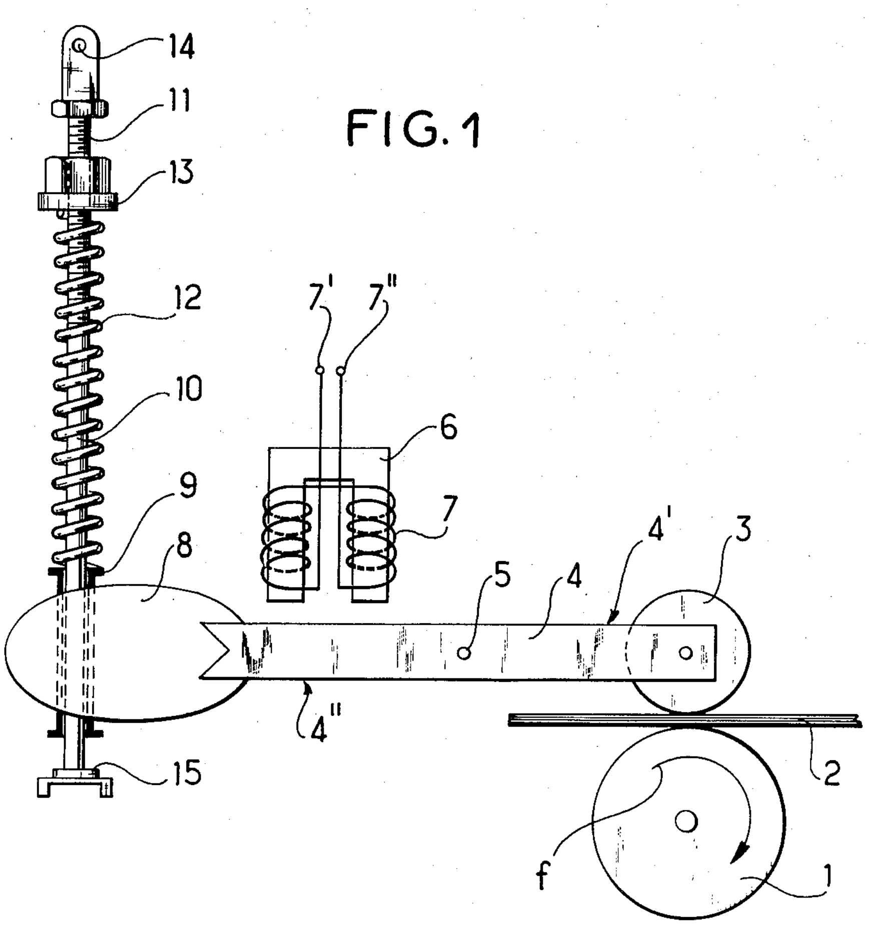
FIG. 1 is a schematic view of a capstan drive arrangement.

Referring to FIG. 1, a capstan drive arrangement includes a motor-driven capstan 1 which rotates continuously in the direction of the arrow *f*. The tape 2 to be driven passes over the capstan 1. Opposite capstan 1 and on the opposite side of the tape 2 is an idler roller 3 carried on a lever arm 4 pivotable about a fixed axis 5 parallel to the axes of the idler roller 3 and capstan 1.

An electromagnet 6 with winding 7 connected between terminals 7′, 7″ is selectively operable to pivot the lever arm 4, which is made of a magnetic material, about the axis 5, so as to urge the idler roller 3 towards the capstan 1. This produces a tape-driving pinch spot. The lever arm 4 is so arranged that when the electromagnet 6 is not operated, the idler roller 3 contacts the tape 2 with substantially negligible pressure.

The drive arrangement also includes a damping system comprising a mass of elastomer material 8, silastene, for example, molded on to that end of the lever arm 4 opposite idler roller 3, and also molded around a tube 9. The mass of silastene provides an elastically deformable connection between the lever 4 and this tube 9.

The tube 9 can slide with some friction on a rod 10 having one end portion 11 screw-threaded. The tube 9 and rod 10 are coupled together by a coil spring 12 fastened at one end to the tube 9 and at the other end to a nut 13 screw-threaded on to the threaded portion 11 of the rod 10. The rod is attached to a fixed point 14 at the screw-threaded end, and the spring 12 abuts against an adjustible abutment 15 at its opposite end.

The spring 12 is preferably relatively long with respect to the remainder of the capstan drive arrangement, with a length suitably of the order of 5 to 10 centimeters.

The damping force provided by the spring 12 may be adjusted by varying the positions of nut 13. Once the adjustment has been made for a particular thickness of tape, negligible disturbance will occur for other tape thicknesses, since a wide range of tape thicknesses will produce movements of the end of spring 12 of the order of some few hundredths of a millimeter, which will be without substantial effect on the spring force where the spring length is of the order of 10 centimeters.

Figure 2:
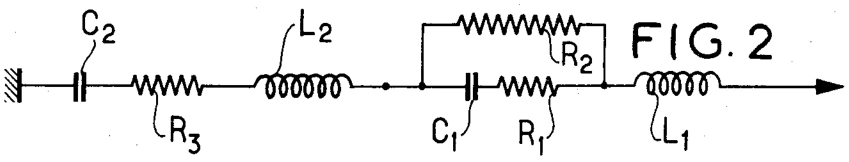
FIG. 2 is an electrical analog of the arrangement.

FIG. 2 shows the electrical analog of the system. The mass of the lever 4 is represented by an inductance $L_1$. The damping system of the silastene mass 8 is represented by the capacitance $C_1$ in series with a resistance $R_1$, this combination being shunted by a resistance $R_2$. An inductance $L_2$ represents the mass of the tube 9, and resistance $R_3$ represents the friction forces between tube 9 and rod 10. A capacitance $C_2$ represents the elasticity of spring 12.

The analog comprises a first resonant circuit, which will be referred to as circuit I, formed by inductance $L_1$, capacitance $C_1$ and resistances $R_1$, $R_2$. A second resonant circuit II, comprises inductance $L_2$, capacitance $C_2$, and resistance $R_3$.

The resonant frequency of circuit II is relatively low and is increasingly so as the damping represented by this circuit is increased. The mechanical equivalent of the junction of circuits I and II may be considered as substantially fixed for the high operational frequency of the lever 4. The adjustment of this lever for a particular tape thickness is thus conserved for other thicknesses.

Figure 3:
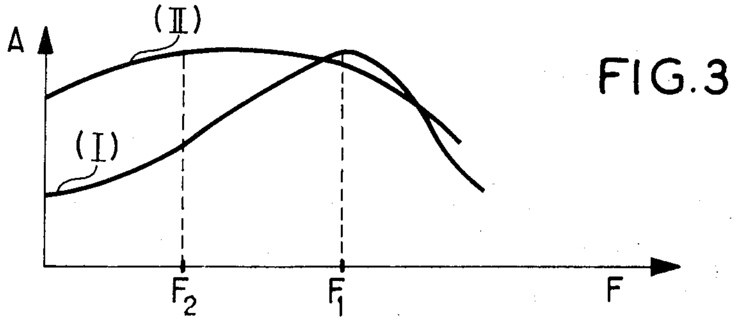
FIG. 3 shows two resonance curves of the arrangement.

FIG. 3 shows two resonance curves, in arbitrary units, for circuits I and II. Curve I is relatively peaked with a resonant frequency $F_1$. Curve II is more highly damped with a lower resonant frequency $F_2$.

The over-all system has an equivalent curve being the resultant of curves I and II of FIG. 3. This corresponds to a highly damped system with a flat resonance curve.

The invention is able to provide a highly damped capstan drive system which is self-regulating in that the adjustment for a given tape thickness is maintained for a wide range of tape thickness, and is maintained for a wide range of tape advance speeds.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed is:

1. A capstan drive arrangement suitable for a high-speed intermittent tape drive, comprising a motor-driven capstan, an idler roller carried on a lever arm, an electromagnet selectively operable to pivot the lever arm about its axis to urge the idler roller towards the capstan to produce a tape-driving pinch spot, and damping means for positioning the lever arm so that when the electromagnet is not operated, the idler roller contacts the tape with substantially negligible pressure, said damping means including an elastically deformable connection between the lever arm and a tube slidable on a rod, the tube and rod being coupled together by a spring and one end of said rod being maintained in position.

2. An arrangement as claimed in claim 1, in which the elastically deformable connection comprises a mass of elastomer material molded on the lever arm and to the tube.

3. An arrangement as claimed in claim 2, in which the elastomer material is silastene.

4. An arrangement as claimed in claim 1, in which the spring is a coil spring concentrically surrounding the rod.

5. An arrangement as claimed in claim 4, in which the spring has a length of between 5 and 10 centimeters.

6. An arrangement as claimed in claim 4, in which the coupling point of said spring to said rod is movable along said rod so that the spring force is adjustable.

7. An arrangement as claimed in claim 6, in which one end of the spring is attached to a nut threaded on to a screw-threaded portion of the rod, so that the position of that end of the spring may be adjusted by moving the nut along the rod.

8. An arrangement as claimed in claim 7, in which the opposite end of the rod to the screw-threaded end portion provides an abutment determining the limit of movement of said tube.

* * * * *